Feb. 5, 1946.　　　　A. P. POLLARD　　　　2,394,202

TOOL BIT GRINDING MACHINE

Filed Jan. 11, 1944

INVENTOR.
Aloysious P. Pollard.
BY
A. E. Wilson.
ATTORNEY.

Patented Feb. 5, 1946

2,394,202

UNITED STATES PATENT OFFICE 2,394,202

TOOL BIT GRINDING MACHINE

Aloysious P. Pollard, Highland Park, Mich.

Application January 11, 1944, Serial No. 517,817

2 Claims. (Cl. 51—218)

This invention relates to machine tools and more particularly to an improved grinder for shaping tool bits and other elements having angularly related surfaces.

Heretofore it has been virtually impossible to accurately shape tool bits and other elements wherein true radial surfaces are bounded by angularly disposed side walls of the same or different angular inclinations, because no machine tool having the necessary adjustments was available to accurately guide the tool bit or other element relative to a grinding wheel.

An object of this invention is therefore to provide an improved grinder capable of grinding a piece of work relative to a grinding wheel to form on the work a true radial surface bounded by angularly disposed side walls of the same or different angular inclinations.

A further object of the invention resides in the development of an improved method of shaping tool bits and other elements having true radial surfaces bounded by angularly disposed side walls wherein the element is positioned angularly to provide side walls of the desired angular relation and is guided in the plane of the required radius.

Another object is to provide a grinding tool having vertically spaced angularly adjustable members rotatably mounted relative to each other, and a work supporting member angularly adjustable in a different plane mounted on the upper member whereby a piece of work may be moved relative to a grinding wheel to form a generally conical shaped radial surface of any desired angularity on a piece of work mounted on the work supporting member.

A further object is to provide an improved grinder having a work supporting member mounted on oppositely disposed angularly adjustable members and adapted to oscillate about a vertical axis to engage a cutting wheel to provide the work with a radial surface determined by the distance of the cutting wheel from the vertical axis, and to form angularly inclined side walls of the same or different angular inclinations on the work determined by the setting of the angularly adjustable supports.

Another object of the invention is to provide an improved grinder for shaping angularly related male or female surfaces.

Still a further object is to provide a metal shaping machine having a plurality of adjustments in the longitudinal plane of the element to be shaped when in a neutral position and an adjustment substantially at right angles thereto whereby the element to be shaped may be presented to a cutting wheel to form side walls of any desired angularity thereon.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views:

Fig. 1 is a plan view of a tool bit illustrating the desired curvature.

Fig. 2 is a side elevation of the tool bit illustrated in Fig. 1.

Fig. 3 is a front end elevation of the bit illustrated in Fig. 1.

Fig. 4 is a side elevational view, partly in section, of a grinder embodying the present invention.

Fig. 5 is an end elevation of the grinder taken from the left hand end of Fig. 4.

Fig. 6 is a sectional view taken substantially on the line 6—6 of Fig. 5 looking in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Referring now to Figs. 1 to 3 it will be noted that a tool bit 10 is provided with a radial cutting or end portion 12. As illustrated at Fig. 2 the front end of the bit is relieved angularly as illustrated at 14, and the side walls are tapered angularly as illustrated at 16 and 18 in Fig. 3. In certain types of tool bits it is desirable in order to prevent heating of the tool and to provide proper clearance that the angularly disposed side walls 16 and 18 be formed at different angular relations relative to the neutral vertical axis of the bit. For example it may be desirable that the angularly related surface 16 be approximately two degrees and that the angularly related surface 18 be approximately three degrees.

A grinder capable of readily forming true radial surfaces bounded by angularly disposed side walls of the desired angular curvature interconnected throughout by true radial surface is illustrated in Figs. 4 and 5. A base 20 is provided with an arcuate shaped support 22 adapted to receive a member 24 having an arcuate shaped lower portion 26 contoured to be received by the arcuate shaped support 22.

Spaced graduations 28 are formed in one of the side walls of the arcuate shaped support 22. An indicator 29 carried by the member 24 is provided to register with the graduations 28 to permit setting the member 24 in any desired angular relation relative to the arcuate shaped portion 22 of the base 20. The arcuate shaped member 24 may be moved to any desired adjusted position by means of a lead screw 30 journaled in a pivoted block 32 carried by the member 24 and extending through a threaded block 34 journaled on the arcuate shaped portion 22 of the base 20. The lead screw 30 may be actuated by a hand wheel 36 to move the members to the desired angular relation. Spaced clamps 38 actuated by bolts 40 projecting into the arcuate shaped member 24 may be provided to releasably clamp the members in any desired adjusted position.

A slide 42 is mounted on the arcuate shaped member 24 and is movable longitudinally thereof on suitable ways 44 interposed between the slide 42 and the top surface of the arcuate shaped member 24. The slide may be actuated by the lead screw 45 controlled by a hand wheel 46 to move it to any desired adjusted position determined by an indicator 48 movable over graduations 50 formed in the top portion of the arcuate shaped member 24.

A rotatable table 52 is mounted on the slide 42 by means of suitable journal box 54. Spaced bearings 56 may be interposed between the rotatable table 52 and the slide 42 to facilitate rotation or oscillation of the table on the slide. If desired a screw 58 threaded through the table 52 and provided with a handle 60 may be provided to urge a pad 62 into engagement with the surface of the slide 42 to lock the table 52 against rotation.

Another slide 64 mounted on suitable ways 66 interposed between the rotatable table 52 and the slide 64 may be provided to permit longitudinal movement of the slide 64 by actuation of a handle 68 to move an indicator 70 along graduations 72 to permit setting of the slide 64 in any desired adjusted position relative to the axis 73 of the rotatable table 52.

A member 80 having an arcuate shaped base 82 is provided to contact an arcuate shaped top portion 84 of the member 64 to effect a desired angular adjustment of the tool carrying member relative to the axis 73 of rotation of the rotatable table 52. One of a pair of spaced clamps 90 carried by the member 80 is provided with an indicator 92 adapted to move relative to graduations 94 on the member 64 to provide desired angular adjustment of the member 80 relative to the member 64 upon actuation of a control member 98.

The member 80 is provided with a portion 100 adapted to receive a member 102 having an arcuate shaped bottom portion 104 adapted to seat against an arcuate shaped upper portion 106 of the portion 100 of the member 80 to be moved to any desired adjusted position thereon by means of lead screw 108 actuated by a handle 109. The lead screw 108 is journaled in a pivoted block 110 carried by the portion 100 and is journalled in a block 112 journalled in the member 102. One of a pair of spaced clamps 114 is provided with an indicator 116 adapted to move over spaced graduations of a scale 118 carried by the portion 100 of the member 80. The clamps 114 may be tightened to lock the member 102 against undesired movement by means of bolts 120.

The member 102 is provided with a work carrying member 122 having spaced work engaging jaws 124 and 126 mounted on suitable spaced ways 128 and 130 and actuated by a lead screw 132 actuated by a handle 134. The work holding vise is of the self-centering type wherein actuation of the handle 134 moves the jaws 124 and 126 equal distances in opposite directions.

In the operation of this device the tool bit or other element 10 to be operated upon is clamped between the jaws 124 and 126 of the self-centering vise by actuation of the handle 134. The face of the tool to be formed is brought into contact with the surface of a cutting wheel 136 mounted on a shaft 138, and the angularly movable portions of the grinder are adjusted to provide the necessary angular adjustments to hold the end of the element 10 relative to the cutting wheel 136 to insure the desired movement of the element 10 relative to the cutting wheel. The cutting wheel 136 is then rotated at high speed and the rotatable table 52 is oscillated on its axis 73 to move the front end of the bit in the required plane to form a desired contour on the end of the bit.

The radius 12 of the tool bit or other element 10 is determined by the distance of the end of the bit 10 in contact with the surface of the cutting wheel 136 from the axis 73. The further the front end of the bit contacts the cutting wheel to the right of the axis 73, the larger will be the radius of the curvature formed on the bit. Conversely by moving the point of contact of the end of the bit and the cutting wheel to the left of the axis 73, as viewed in Fig. 4, slots may be cut in the end of the bit or other work. The radius of the slot may be varied by changing the distance of the point of contact to the left of the axis 73. The further the axis is moved to the left the larger will be the radius of the slot. It will be understood that the cutting wheel 136 must be of less diameter than the slot to be cut.

As an example of the setting of the various scales, to provide the desired angularity of the various portions of the tool bit or article 10 illustrated in Figs. 1 to 3, assume that it is desired to shape the bit with a two degree clearance angle on the side 16 and with a three degree clearance angle 18 as viewed in Fig. 3. These two angles are added together giving a total of five degrees. This total is divided by half, and the arcuate shaped member 24 is moved relative to the contoured portion 22 of the base 20 by operation of the hand wheel 36 to set the indicator 29 opposite the two and one-half degree graduation of the scale 28 in the direction of the arrow 140 extending to the right. Assume that the clearance angle 14 on the front end of the bit as illustrated in Fig. 2 is ten degrees. The two and one-half degree setting of the base should be subtracted from the desired ten degree clearance angle leaving a desired angle of seven and one-half degrees. The member 80 should be moved by actuation of the hand wheel 98 to set the indicator 92 opposite the seven and one-half degree graduation of the scale 94 in the direction of the arrow 142.

To obtain the different side angle clearances at 16 and 18 of two degrees on the left and three degrees on the right of the bit as viewed in Fig. 3, the smaller angle is subtracted from the larger angle giving a result of one degree. This figure is divided by half giving a desired reading of one-half degree. The member 102 is moved on the portion 100 of the member 80 by operation of the handle 109 to set the indicator 116 opposite the one-half degree graduation in the direction of the arrow 144 as illustrated in Fig. 5.

The adjustment for the desired radius 12 of the tooling bit or other article 10 is, as indicated above, obtained by projecting the end of the tool bit beyond the axis of rotation 73 of the rotatable table. The hand wheel 68 may be progressively actuated to move the work into contact with the cutting wheel 136, and a suitable stop may be provided to limit the movement of the work at the desired point.

When the necessary adjustments have been made the cutting wheel 136 is rotated and the table 52 is oscillated about the axis 73 through a desired angle to cut the end of the tool as indicated. Where no undercut or side clearance is required the tool may be rotated through ninety degrees in each direction from the point when the front of the bit is in contact with the cutting wheel and aligned with the axis of the shaft 138 of the cutting wheel.

If side clearance is required, the rotatable table 52 may be oscillated beyond the ninety degree point. If desired this clearance can be obtained on opposite sides of the bit. If it is desired to cut the tool with a front radius followed by a substantially straight axial portion as illustrated at 13 in Fig. 1, one of the slides may be actuated on its associated ways to insure movement of the bit or other element along the cutting surface of the cutting wheel 136 to effect the desired result. The rotatable table 52 may be provided with a geared segment 150 actuated by a pinion 152 controlled by a handle 154 to effect the desired oscillation of the table.

I claim:

1. A grinder for shaping a member having angularly disposed walls of the same or different angular inclinations interconnected by true radial surfaces comprising a work holding fixture, a base, a member superimposed on the base, connecting means between said base and member whereby the angular relation of the member relative to the base may be varied, a slide movable longitudinally of said member, a rotatable member mounted on the slide, means to oscillate the rotatable member relative to the slide, vertically spaced angularly adjustable members interposed between the rotatable member and the work holding fixture to vary the angular inclination of the work holding fixture in intersecting planes relative to the rotatable member, a slide interposed between the angularly adjustable members and the rotatable member to vary the horizontal position of the angularly adjustable members, and a cutting wheel positioned to engage a piece of work carried by the work holding fixture.

2. A grinder for shaping tool bits having front and side cutting surfaces defined by clearance walls of any desired angular inclinations interconnected by true radial surfaces comprising a cutting tool, a tool bit, a base, a member mounted on the base, means to vary the angular relation of said member on the base to vary the angular inclination of the side clearance walls, a slide mounted on said member to vary the arc of the radial surfaces interconnecting the side clearance walls, a rotatable table mounted on the slide to form the radial surfaces, a slide mounted on the rotatable table to move the tool bit into engagement with the cutting tool, a front angle adjusting member mounted on the last named slide, means to vary the angular relation of the front angle adjusting member relative to the last named slide, a side angle equalizing member mounted on the front angle adjusting member, means to vary the angular relation of the side angle equalizing member relative to the front angle adjusting member, and means to clamp the tool bit to the side angle equalizing member.

ALOYSIOUS P. POLLARD.